(12) United States Patent
Ye et al.

(10) Patent No.: US 10,499,056 B2
(45) Date of Patent: Dec. 3, 2019

(54) SYSTEM AND METHOD FOR VIDEO PROCESSING BASED ON QUANTIZATION PARAMETER

(71) Applicant: SONY CORPORATION, Tokyo (JP)

(72) Inventors: Peng Ye, Foster City, CA (US); Xun Xu, Palo Alto, CA (US)

(73) Assignee: SONY CORPORATION, Tokyo (JP)

( * ) Notice: Subject to any disclaimer, the term of this patent is extended or adjusted under 35 U.S.C. 154(b) by 207 days.

(21) Appl. No.: 15/065,248

(22) Filed: Mar. 9, 2016

(65) Prior Publication Data

US 2017/0264902 A1    Sep. 14, 2017

(51) Int. Cl.
| | |
|---|---|
| *H04N 19/00* | (2014.01) |
| *H04N 19/124* | (2014.01) |
| *H04N 19/176* | (2014.01) |
| *H04N 19/154* | (2014.01) |

(52) U.S. Cl.
CPC ......... *H04N 19/124* (2014.11); *H04N 19/154* (2014.11); *H04N 19/176* (2014.11)

(58) Field of Classification Search
CPC .. H04N 19/124; H04N 19/176; H04N 19/196; H04N 19/154; G06T 9/002
See application file for complete search history.

(56) References Cited

U.S. PATENT DOCUMENTS

| | | | |
|---|---|---|---|
| 5,241,383 A | 8/1993 | Chen et al. | |
| 6,574,279 B1* | 6/2003 | Vetro | H04L 29/06027 375/240.08 |
| 7,995,649 B2 | 8/2011 | Zuo et al. | |
| 8,665,948 B2 | 3/2014 | Agarwal et al. | |
| 2013/0195207 A1* | 8/2013 | Xue | H04N 19/44 375/240.29 |
| 2013/0294703 A1* | 11/2013 | Rezazadeh | G06T 7/0002 382/218 |
| 2014/0067679 A1* | 3/2014 | O'Reilly | G06F 21/32 705/44 |

FOREIGN PATENT DOCUMENTS

| | | |
|---|---|---|
| JP | 08-079748 A | 3/1996 |
| JP | 2006-505853 A | 2/2006 |
| JP | 2010-541386 A | 12/2010 |

OTHER PUBLICATIONS

Zhu et al. "A Novel Quantization Parameter Estimation Model Based on Neural Network". 2012 International Conference on Systems and Informatics (ICSAI 2012), pp. 2020-2023.*

Yoon et al. "Learning a Deep Convolutional Network for Light-Field Image Super-Resolution". 2015 IEEE International Conference on Computer Vision Workshop, pp. 57-65.*

(Continued)

*Primary Examiner* — Zhihan Zhou
(74) *Attorney, Agent, or Firm* — Chip Law Group

(57) ABSTRACT

Various aspects of a system and method to process video based on quantization parameters are disclosed herein. In an embodiment, the method includes extraction of a plurality of features to capture texture information of an image block. A neural network regressor is trained to map the extracted plurality of features to determine an optimal quantization parameter. The image block is encoded by use of the determined optimal quantization parameter.

20 Claims, 6 Drawing Sheets

(56) References Cited

OTHER PUBLICATIONS

Dong et al. "Image Super-Resolution Using Deep Convolutional Networks". IEEE Transactions on Pattern Analysis and Machine Intelligence, 2015, pp. 1-14.*

Jinbao Cai et al., "An Enhanced Rate Control Initialization Method for H.264 Based on Image Quality Balance of GOP Using Support Vector Machines", Journal of Networks, vol. 8, No. 9, Sep. 2013, pp. 8.

R. Bailleul et al., "Content Feature Based Bit Rate Modelling for Scalable Video Coding Using Machine Learning Algorithms", Multimedia and Expo Workshops (ICMEW), 2013 IEEE International Conference, Jul. 15-19, 2013, pp. 4, San Jose, CA.

Bharathi, et al,. "Optimization of Image Processing Techniques Using Neural Networks: A Review", WSEAS Transactions on Information Science and Applications, Issue 8, vol. 8, Aug. 1, 2011, pp. 300-328.

Park, et al,. "Quantization Parameter Selection Method for H.264-Based Multi-View Video Coding", The Journal or Korean Institute of Communications and Information Sciences, vol. 32, Issue 6C, 2007, pp. 579-584.

Egmont-Petersen, et al., "Image Processing With Neural Networks—A Review", Pattern A Recognition, vol. 35, Issue 10, Oct. 2002, pp. 2279-2301.

International Search Report and Written Opinion of PCT Application No. PCT/US2017/020468, dated May 31, 2017, 09 pages.

Zhu, et al., "A novel quantization parameter estimation model based on neural network" IEEE, International Conference on Systems and Informatics (ICSAI2012), May 19-20, 2012, pp. 2020-2023.

Kang, et al., "Convolutional Neural Networks for No-Reference Image Quality Assessment", IEEE Conference on Computer Vision and Pattern Recognition, Jun. 2014, pp. 1733-1740.

Office Action for JP Patent Application No. 2018-547306, dated Aug. 21, 2019, 03 pages of Office Action and 05 pages of English Translation.

\* cited by examiner

SYSTEM AND METHOD FOR VIDEO PROCESSING BASED ON QUANTIZATION PARAMETER

CROSS-REFERENCE TO RELATED APPLICATIONS/INCORPORATION BY REFERENCE

None.

FIELD

Various embodiments of the disclosure relate to video processing. More specifically, various embodiments of the disclosure relate to video processing based on quantization parameter.

BACKGROUND

Advancements in the field of video-processing technologies have revolutionized the digital industry and its associated devices and applications. With the popularity of high-resolution video content services, the development of video encoding technologies have gained importance.

In certain scenarios, it may be difficult to maintain a certain quality level of video content across different image blocks and/or image frames while the number of bits used to encode one or more image blocks of the video content are reduced. An advanced and a systematic technique may be required so that the video quality may not fluctuate across different image blocks and/or the image frames and the overall video quality may be optimized in an encoded video.

Further limitations and disadvantages of conventional and traditional approaches will become apparent to one of skill in the art, through comparison of described system with some aspects of the present disclosure, as set forth in the remainder of the present application and with reference to the drawings.

SUMMARY

A system and a method to process video content based on quantization parameters substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method to process video based on quantization parameters. Exemplary aspects of the disclosure may comprise a method that may extract a plurality of features to capture texture information of an image block. A neural network regressor may be trained to map the extracted plurality of features to determine optimal quantization parameter (QP). The image block may be encoded by use of the determined optimal QP.

In accordance with an embodiment, the image block of a first image frame may be encoded with a plurality of QPs used to generate a plurality of reconstructed image blocks for the image block of the first image frame. An image quality measure may be utilized for each of the plurality of reconstructed image blocks to determine the optimal QP for the image block.

In accordance with an embodiment, the image quality measure may be a full-reference image quality measure based on a convolution neural network. A score may be generated for each of the plurality of reconstructed image blocks by use of the image quality measure. The score may indicate a measure of visual quality of each of the plurality of reconstructed image blocks.

In accordance with an embodiment, the value of the determined optimal QP may be highest amongst values of the plurality of QPs that are used to generate a plurality of reconstructed image blocks for the image block. The value of the determined optimal QP may also be greater than or equal to a pre-specified image quality threshold.

In accordance with an embodiment, a training data set may be generated based on the extracted plurality of features that correspond to the determined optimal QP of the image block. The generated training data set may include a plurality of features of other image blocks of the first image frame of a video and corresponding optimal QPs. The plurality of features of other image blocks may be extracted to capture texture information of the other image blocks.

In accordance with an embodiment, the generated training data set may be utilized to train the neural network regressor. A mapping function, between the extracted plurality of features and the determined optimal QP of the image block, may be determined based on the trained neural network regressor. In accordance with an embodiment, the neural network regressor may be a feed-forward neural-network-based regression model. Another optimal QP may be predicted for another image block of a second image frame, based on the trained neural network regressor.

Figure 1:
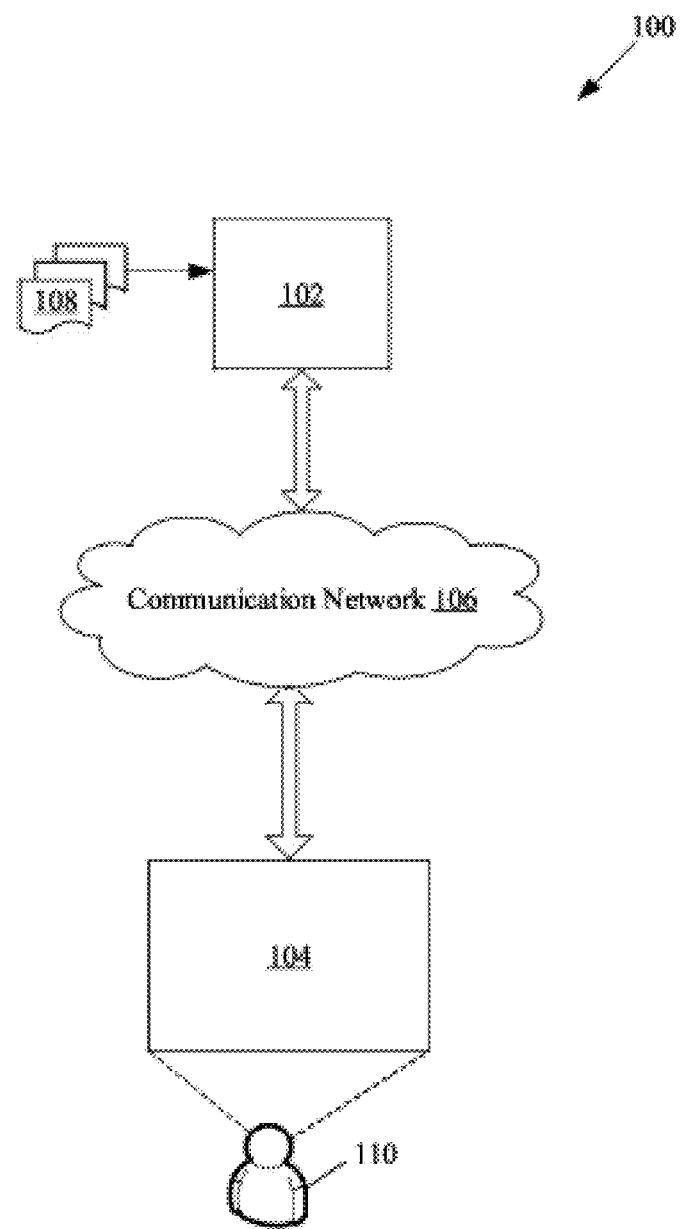
FIG. 1 is a block diagram that illustrates a network environment to implement the disclosed system and method to process video based on quantization parameters, in accordance with an embodiment of the disclosure.

FIG. 1 is a block diagram that illustrates a network environment to implement the disclosed system and method to process video based on quantization parameters, in accordance with an embodiment of the disclosure. With reference to FIG. 1, there is shown a video-processing device 102, a display device 104, a communication network 106, a video 108, and one or more users, such as a user 110.

In accordance with an embodiment, the video-processing device 102 may be communicatively coupled to the display device 104, and one or more servers (not shown), via the communication network 106. In accordance with an embodiment, the user may be associated with the display device 104, and/or the video-processing device 102.

The video-processing device 102 may comprise a suitable logic, circuitry, interfaces, and/or code that may process one or more video content, such as the video 108, to generate an encoded video. Examples of the video-processing device 102 may include, but are not limited to, a digital camera, a camcorder, a video codec, a smartphone, a projector, a tablet computer, a laptop, a server, a gaming device, a media streaming device, a video conferencing equipment, and/or an encoder, and/or other computing device.

The display device 104 may comprise suitable logic, circuitry, interfaces, and/or code configured to render the encoded video after decoding. Examples of the display device 104 may include, but are not limited to, a television (such as a high-definition television (HDTV)), an ultra-high-definition television (UHDTV), an internet protocol television (IPTV), a digital media receiver, a media playback device, a video codec, a smartphone, a gaming device, video conferencing equipment, and/or a decoder, and/or other computing device.

The communication network 106 may include a medium through which the video-processing device 102 may communicate with one or more display devices, such as the display device 104, and one or more servers. Examples of the communication network 106 may include, but are not limited to, the internet, a cloud network, a Wireless Local Area Network (WLAN), a Local Area Network (LAN), a plain old telephone service (POTS), and/or a Metropolitan Area Network (MAN). Various devices in the network environment 100 may be operable to connect to the communication network 106, in accordance with various wired and wireless communication protocols. Examples of such wired and wireless communication protocols may include, but are not limited to, Transmission Control Protocol and Internet Protocol (TCP/IP), Long Term Evolution (LTE), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the video-processing device 102 may be configured to receive an image sequence of the video 106. The video-processing device 102 may be configured to extract a plurality of features (described in FIG. 2) to capture texture information of an image block. The image block may refer to an input image block of a first image frame of the video 108. The video-processing device 102 may be configured to encode the image block of the first image frame with a plurality of QPs to generate a plurality of reconstructed image blocks for the input image block of the first image frame.

In accordance with an embodiment the video-processing device 102 may be configured to generate a score for each of the plurality of reconstructed image blocks. The score may be generated by use of an image quality measure. The image quality measure may be a full-reference image quality measure, based on convolution neural network (FRCNN). Notwithstanding, the image quality measure may be any other method, such as other full reference method, reduced reference method, and/or no reference methods, for objective image quality assessment, without departure from the scope of the disclosure. The generated score may indicate a measure of visual quality of each of the plurality of reconstructed image blocks.

Figure 3:
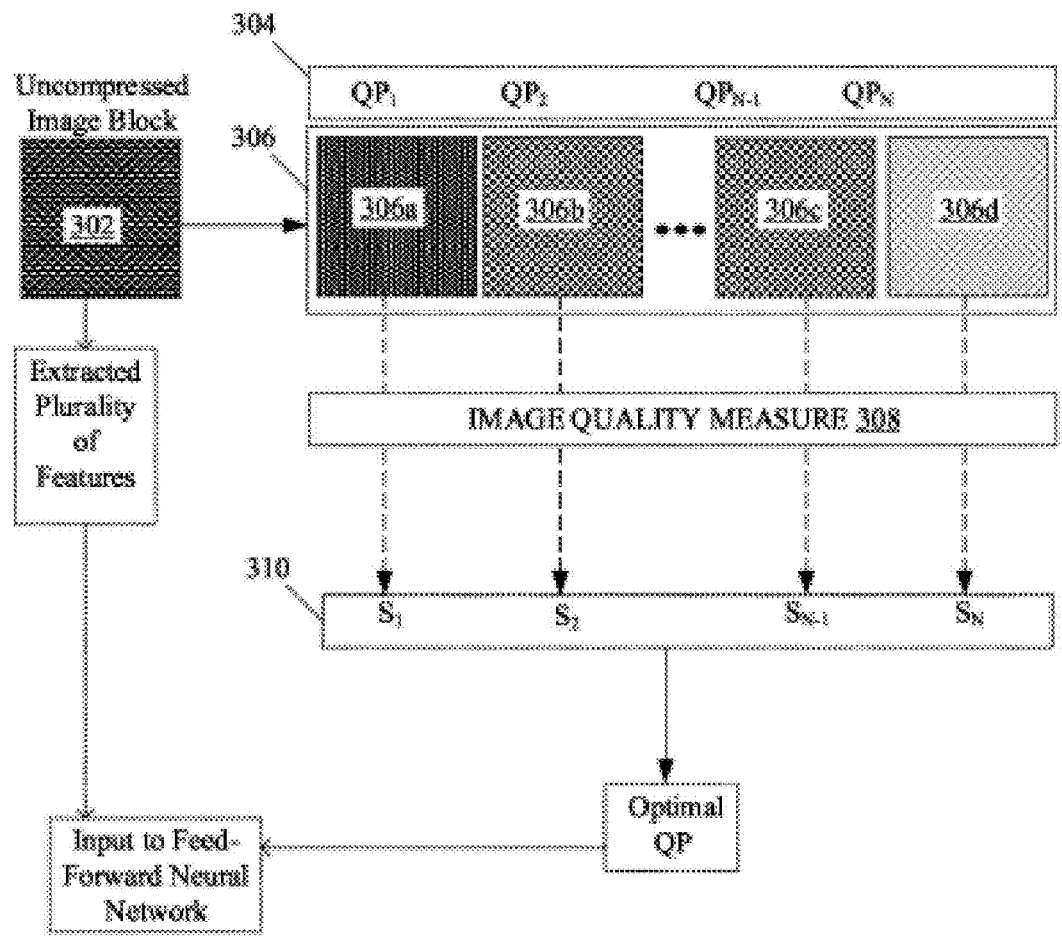
FIG. 3 illustrates an exemplary optimal quantization parameter prediction technique for the implementation of the disclosed system and method to process video based on quantization parameters, in accordance with an embodiment of the disclosure.

In accordance with an embodiment, the video-processing device 102 may be configured to determine an optimal quantization parameter for the image block from among the plurality of QP values (shown and described in detail in FIG. 3). The optimal QP for the image block may be determined by use of the image quality measure, such as the FRCNN, for each of the plurality of reconstructed image blocks and a quality threshold. A value of the determined optimal QP may be highest amongst the values of the plurality of QPs. The value of the determined optimal QP may be greater than or equal to the pre-specified image quality threshold.

In accordance with an embodiment, the video-processing device 102 may be configured to encode the image block by use of the determined optimal quantization parameter. The video-processing device 102 may be configured to extract the plurality of features of another image block of the first image frame of the video 108. The video-processing device 102 may be further configured to determine an optimal QP for the other image block. This may be done with a process similar to that as described above by use of the image quality measure, such as the FRCNN, and the quality threshold.

In accordance with an embodiment, the video-processing device 102 may be configured to generate a training data set. The training data set may be based on the extracted plurality of features and corresponding determined optimal QP of the image block. Similarly, the extracted plurality of features and corresponding determined optimal QP of the other image block may also be utilized to form the training data set. A large training data set may be generated by use of the plurality of features of various image blocks of one or more image frames, such as at least the first image frame, of the video 108, and associated optimal QPs.

In accordance with an embodiment, the video-processing device 102 may be configured to train a neural network regressor based on the generated training data set. In accordance with an embodiment, the neural network regressor may be a feed-forward neural-network-based regression model. The video-processing device 102 may be configured to determine a mapping function and/or a relation between the extracted plurality of features and the determined optimal QPs of the various image blocks (such as the image block and the other image block) in the training of the neural network regressor.

In accordance with an embodiment, subsequent to the training of the neural network regressor, the video-processing device 102 may be configured to process an image block of subsequent image frames, such as a second image frame, of the video 108 or another video. The video-processing device 102 may be configured to determine (or predict) another optimal QP for the image block of the second image frame by use of the trained neural network regressor. Similarly, various image blocks of the second image frame and other image frames of the video 108 may be efficiently and quickly encoded by use of associated optimal QPs. The optimal QPs may be predicted based on the trained neural network regressor, and may be used to generate an encoded video. The video 108, encoded by use of the encoding technique as described above, may preserve a consistent visual quality across different image blocks and/or the encoded image frames of the encoded video.

In accordance with an embodiment, the encoded video may be stored with reduced storage space as compared to the storage space required to store the video 108. As quantization operation is a lossy compression, a high compression may be achieved while the consistency in the video quality across different image blocks and/or the image frames is preserved. This may be accomplished by use of the encoding technique, as described above. The video-processing device 102 may store the encoded video at a local storage (such as a memory), of the video-processing device 102 or a content server (not shown). In accordance with an embodiment, the values of the optimal QPs used in the encoding may be stored together with the encoded video.

In accordance with an embodiment, the encoded video may be decoded at the video-processing device 102 by use of the same optimal QPs used while encoding. The video quality may not fluctuate across different image blocks and/or image frames during playback. Further, the overall video quality may be optimized when viewed by user, such as the user 110. In accordance with an embodiment, the encoded video may be transmitted to one or more display devices, such the display device 104, via the communication network 106. In such cases, the encoded video may be decoded and subsequently rendered at the display device 104. The overall video quality, as perceived by the user 110 during playback may be highly optimized.

Figure 2:
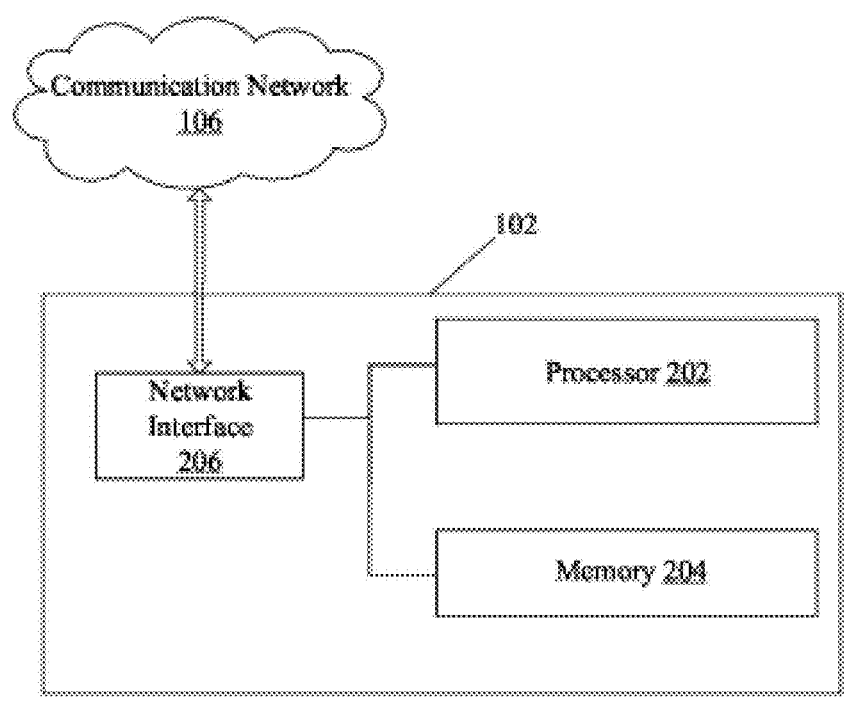
FIG. 2 is a block diagram that illustrates an exemplary video-processing device, in accordance with an embodiment of the disclosure.

FIG. 2 is a block diagram that illustrates an exemplary video-processing device, in accordance with an embodiment of the disclosure. With reference to FIG. 2, there is shown the video-processing device 102. The video-processing device 102 may comprise one or more processors, such as a processor 202, a memory 204, and a network interface 206. The processor 202 may be communicatively coupled to the memory 204 and the network interface 206. The network interface 206 may be configured to communicate with the display device 104 and one or more servers, via the communication network 106.

The processor 202 may comprise suitable logic, circuitry, interfaces, and/or code that may be configured to execute a set of instructions stored in the memory 204. The processor 202 may be referred to as a video processor. The processor 202 may be implemented based on a number of processor technologies known in the art. Examples of the processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 204 may comprise suitable logic, circuitry, and/or interfaces that may be configured to store a machine code and/or a set of instructions executable by the processor 202. The memory 204 may further be operable to store video content, such as the video 108, the encoded video, and/or other data. The memory 204 may further be operable to store operating systems and associated applications. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, interfaces, and/or code that may be configured to communicate with the display device 104 and one or more servers, via the communication network 106. The network interface 206 may implement known technologies to support wired or wireless communication of the video-processing device 102 with the communication network 106. The network interface 206 may include various components, such as but not limited to, an antenna, a transceiver, one or more amplifiers, a tuner, one or more oscillators, a digital signal processor, a subscriber identity module (SIM) card, and/or a local buffer. The network interface 206 may communicate via wired or wireless communication by use of the various communication protocols, as described previously in FIG. 1, with regard to the communication network 106.

In operation, the processor 202 may be configured to receive an image sequence of the video 108. The processor 202 may be configured to extract a plurality of features to capture texture information of an image block of a first image frame of the video 108. In accordance with an embodiment, the plurality of features employed to capture texture information may be Haralick texture descriptors, total-variation, and variance features. The Haralick texture descriptors may be computed from the gray-level, co-occurrence matrix (GLCM) to provide the classic 13 texture features, such as angular second moment (ASM), contrast, correlation, sum of squares, inverse difference moment, sum average, sum variance, sum entropy, entropy, difference variance, difference entropy, information measure of correlation 1, and information measure of correlation 2, known in the art. For "N" gray levels and a spatial relationship (such as above, next to, diagonal relationship) of pixels, the GLCM is an "N×N" matrix that captures the probability that two gray levels may co-occur under a given spatial relationship. The GLCM features may be statistically computed based on the GLCM matrix. In accordance with an embodiment, the number of gray-levels used to compute the GLCM may be suitably varied, dependent upon various requirements. Total-variation and variance features may provide statistics of the pixel values within the image or image block that may be processed.

In accordance with an embodiment, to extract the plurality of features at various granularities, the input image block may be divided sequentially into a series of grids of smaller sub-images. The sizes of the grids may be one of 1×1 (original image block), 2×2, 4×4, and 8×8. For each of the grids, the plurality of features described above are extracted for every sub-image, and then these sub-features are concatenated into a final feature vector that may be later used to be fed into a QP prediction neural network (such as a feed-forward neural network described in the FIG. 4). The plurality of features to capture texture information may compose the input layer of the QP prediction neural network. For instance, in this case, a total of 15 features (13 texture features from Haralick texture descriptors, one feature each from total-variation and variance) may be extracted that may compose the input layer of the QP prediction neural network. The plurality of features employed for the QP prediction neural network (such as the feed-forward neural network described in the FIG. 4), may quickly compute and effectively approximate the underlying texture features to QP mapping strategy (as described in FIGS. 3 and 4).

FIG. 3 illustrates an exemplary optimal QP prediction technique for the implementation of the disclosed system and method to process video based on QPs, in accordance with an embodiment of the disclosure. With reference to FIG. 3, there is shown an image block 302 that may be an uncompressed image block, a plurality of QP values 304, a plurality of reconstructed image blocks 306, such as reconstructed image blocks 306a to 306n, an image quality measure 308, and a plurality of scores 310.

In a block-based video encoding technique, the QP determines the number of bits used to encode an image block, such as the image block 302. Further, the QP controls the visual quality of one or more reconstructed blocks, such as the reconstructed image blocks 306a to 306n for the image block 302. In general, smaller QPs yield higher visual quality. However, such higher visual quality ascertained this way may occur at the price of higher bit rate. Ideally, a small QP, such as QP="1", may be used to achieve optimal visual quality. However, the bit rate may be limited by external resources, such as a bandwidth of a network, such as the communication network 106. For a given rate, a properly assigned QP for each image block may be required so that the video quality may be consistent and thus, not fluctuate, across different image blocks and image frames of the video, such as the video 108.

In accordance with an embodiment, the processor 202 may be configured to encode the image block 302 of a first image frame of the video 108. In such a case, the plurality of QP values 304, such as the QP values "1" to "N" ($QP_1$ to $QP_N$) may be used to generate the reconstructed image blocks 306a to 306n. For instance, when "N"="1" to "52", the QP values that range from "1" to "52" may be used to encode the image block 302. In this process, a total of "52" reconstructed (or degraded) image blocks may be obtained. The visual quality of each of the reconstructed image blocks 306a to 306n may then be measured. It may be desirable that the image quality measure is assigned by a human, via subjective tests. However, it may be time-consuming and expensive to perform such large scale subjective tests.

Signal fidelity measures, such as peak signal to noise ratios (PSNR) or mean square errors (MSE), are widely used to measure image distortions. However, human perception does not correlate well with such measures. For example, two blocks with the same PSNR may have very different perceptual quality. Therefore, the use of a poor quality measure may result in quality fluctuations across blocks and frames. Such fluctuations may significantly degrade the visual perception or visual quality. A suitable image quality measure may be used to approximate the subjective quality.

In accordance with an embodiment, the processor 202 may be configured to utilize a full-reference image quality measure, based on convolutional neural network (FRCNN) to determine visual quality of each of the reconstructed image blocks 306a to 306n. The FRCNN quality measure may approximate the subjective quality, and may be a reliable, computationally efficient, and cost-effective image quality measure.

In accordance with an embodiment, the processor 202 may be configured to generate a score, such as "$S_1$ to $S_N$", for each of the plurality of reconstructed image blocks 306, by use of the image quality measure, such as the FRCNN. The generated score may indicate a measure of visual quality of each of the plurality of reconstructed image blocks 306. A higher score may indicate higher quality. A quality threshold, which represents the quality level that needs to be achieved in the reconstructed video, may then be specified. The processor 202 may be configured to determine an optimal QP based on the quality threshold and the plurality of scores 310, generated by use of the image quality measure, such as the FRCNN. The optimal QP may be the highest QP value among the plurality of QP values 304 that meets the quality threshold. In accordance with an embodiment, the quality threshold may be a pre-specified threshold amount. For example, for the image block 302 (the uncompressed image block) "I" and the quality threshold "θ", the QP value assigned to the image block 302 may be represented by the following mathematical expression:

$$QP(I) = \arg\max_{k=1, \ldots, N} S_k > \theta \quad (1)$$

In accordance with an embodiment, the processor 202 may be configured to extract features and subsequently encode all image blocks of the first image frame (a video frame) of the video 108, in a manner similar to the above described process. Thus, in this case, each image block may be automatically mapped to a QP value, which may preserve the visual quality of the image frames, such as first image frame and subsequent image frames, of the video 108.

Conventionally, the QP is often assigned globally. For instance, a uniform QP value may be used to encode all image blocks in one image frame. This may result in a uniform bit allocation strategy. However, the visual properties of different image blocks may not be taken into consideration. Due to their various visual appearances, the different image blocks vary in the ability to conceal distortion caused by the encoding (compression) process. As a result, some image blocks may be more sensitive to compression. That is, the compression artifacts may be easier to observe in these different image blocks. Such image blocks should be allocated with more bits to encode, or equivalently, assigned lower QPs. The uniform bit allocation, without consideration of the visual properties of different image blocks, may not be able to preserve a consistent visual quality across the image frame, as different image blocks would have varying visual quality after compression due to their varying visual property, as discussed above. Because of this, a more reasonable technique or strategy for QP assignment is to preserve a uniform visual quality, instead of a uniform bit number, as described in the disclosure with respect to the FIGS. 1, 2, and 3. The disclosed system and method to process video may provide a QP mapping strategy that may be capable to preserve consistent visual quality across the encoded image frame. It may enable automatic assignment of more bits to image blocks which are more sensitive to compression distortion. In accordance with an embodiment, such determination of the optimal QP may be further accelerated with increased processing performance. Reduced computational cost may be achieved by use of a deep neural network, such as a feed-forward neural network for regression.

Figure 4:
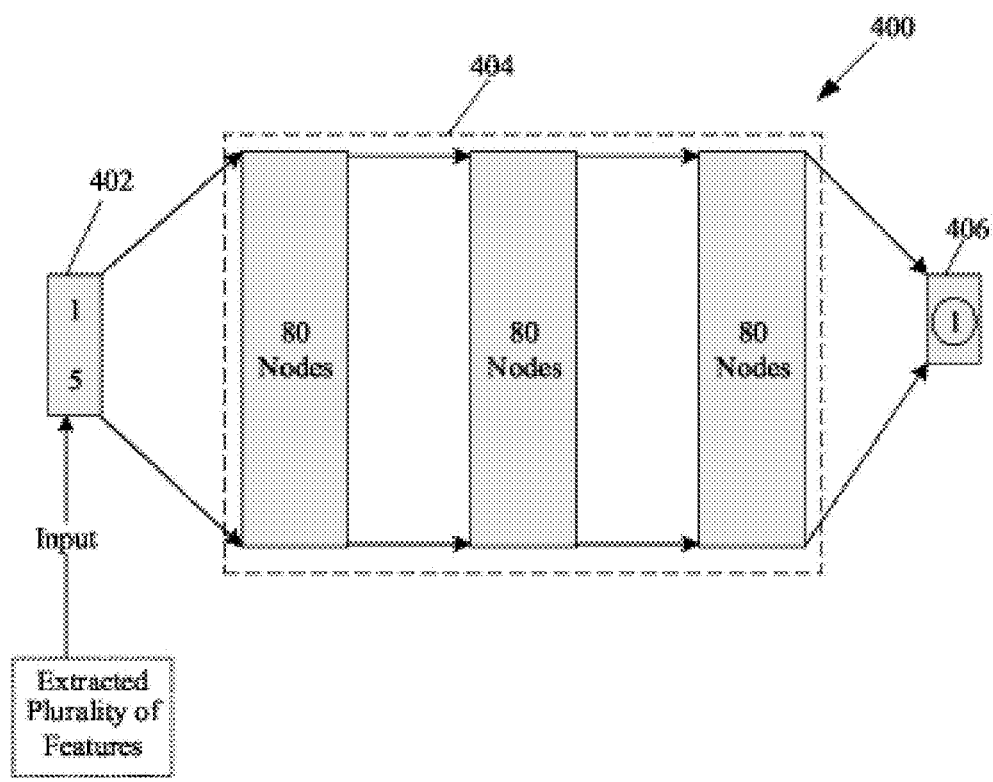
FIG. 4 illustrates an exemplary overview of a feed-forward neural network for the implementation of the disclosed system and method to process video based on quantization parameters, in accordance with an embodiment of the disclosure.

FIG. 4 illustrates an exemplary overview of a feed-forward neural network for the implementation of the disclosed system and method to process video based on quantization parameter, in accordance with an embodiment of the disclosure. With reference to FIG. 4, there is shown a feed-forward neural network 400, which may include an input layer 402, a plurality of hidden layers 404, and an output layer 406.

The input layer 402 of the feed-forward neural network 400 may include the plurality of features related to texture information extracted from an input image block. The plurality of hidden layers 404, such as 3 hidden layers in this case, may include plurality of nodes. In this case, each layer may include 80 nodes. Rectified linear unit, "ReLU", may implement an activation function, "f(x)", which may be used in each hidden layer. The activation function, "f(x)", may be determined based on the following mathematical expression (2):

$$ReLUf(x) = \max(x, 0) \quad (2)$$

The output layer 406 of the feed-forward neural network 400 may include "52" nodes, each of which correspond to one of the possible QP values. The output nodes have activation values between "−1" and "1", where the node with highest activation may predict the target optimal QP value.

The procedure for an optimal QP prediction for each image block to encode the image blocks of the first image frame of the video 108 (as described in FIG. 3), may be repeated for a large set of training image blocks. This may be done to generate a training data set. The generated training data set may be used to train the feed-forward neural network 400 (a neural network regressor) to generate a learned (or trained) neural network regressor. The learned neural network regressor may be used in the process to quickly and reliably map extracted texture features of a given image block to an optimal QP. As the computational resources and associated cost required to encode each image block multiple times with all possible QP values may be high, such prediction of optimal QP may be further optimized and simplified for practical use. This may occur by use of the feed-forward neural network 400 that may be based on the feed-forward neural network based regression model.

In accordance with an embodiment, the feed-forward neural network 400 may be trained in an unsupervised fashion and may be self-organizing. In such a case, a large amount of image texture features extracted from the training image blocks may be fed to the input layer 402. The training (or pre-training) may be performed by an auto-encoding framework, wherein the parameters of the feed-forward neural network 400 may be tuned to be able to form the training input in a best possible manner. In accordance with an embodiment, a back-propagation algorithm may be used to achieve this. For example, let the number of training samples be "K", whose texture feature vectors may be denoted as "$f_k$" and the QP values may be denoted as "$y_k$", where "k=1, . . . , K". The network parameters "(W)" (such as the parameters of the feed-forward neural network 400) may then be optimized by minimizing the following objective function (3):

$$L(W) = \frac{1}{K}\sum_{k=1}^{K} |F(f_k; W) - y_k| \quad (3)$$

where "F" represents the function specified by the feed-forward neural network 400 and "$F(f_k;W)$" is the output of the network for input "$f_k$". The optimization may be achieved by back-propagation.

In accordance with an embodiment, the feed-forward neural network 400 may be improved by feeding a large amount of pairs of extracted texture features (as described in FIGS. 2 and 3) and their associated determined optimal QP values, by the optimal QP prediction technique, as described in FIG. 3. In accordance with an embodiment, the processor 202 may be configured to determine a mapping function between the plurality of features, such as texture features associated with the training image blocks, and the determined optimal QP values. Hence, the feed-forward neural network 400 may learn a relation between the different input (such as the extracted plurality of features to capture the texture information of different training image blocks) and output (such as determined corresponding optimal QP values for the image blocks) during training.

In accordance with an embodiment, during training, the feed-forward neural network 400 may be trained for classification. In such a case, a neural network classifier may be used to predict the optimal QP for an image block for video encoding. A classification scheme treats the different QP values "(1~52)" as categorical values or labels instead of real numbers that have order. For example, in classification, the penalties for misclassifying an image block with QP="1" to QP="2" and to QP="52" may be equal. However, for a block with QP="1", an incorrect prediction of QP="2" is much closer to the real label compared to a prediction of QP="52", therefore, the penalties for these two mistakes should have been different and a higher penalty should be paid for misclassifying QP="1" to QP="52".

In accordance with an embodiment, while in training, the feed-forward neural network 400 may be trained for regression instead of classification. In accordance with an embodiment, while in training, when the feed-forward neural network 400 is trained for regression (referred to as "neural network regressor"), and the QP values are treated as real numbers with orders. In this case, the penalties for misclassifying QP="1" to QP="52" is higher than misclassifying QP="1" to QP="2", as in neural network regressor. In such cases, the QP values are treated as real numbers with orders.

In accordance with an embodiment, when another image block of subsequent image frames, such as the second image frame of the video 108 is to be encoded, the processor 202 may be configured to extract a plurality of features to capture texture information of the other image block. The processor 202 may be configured to quickly map the extracted features of the other image block to determine an optimal QP by use of the trained (or learned) feed-forward neural network 400 neural network regressor). Based on the extracted features, such as the Haralick texture descriptors, total-variation, and variance features, the fully connected nodes in the plurality of hidden layers 404 may use the activation function, in accordance with the mathematical expression (2). One node in the output layer 406 may have the highest activation value, such as "1", as shown. The occurrence of the highest value may indicate the optimal QP value for the extracted features of the other image block.

In accordance with an embodiment, the processor 202 may be configured to predict the optimal QP for the other image block of the second image frame based on the trained (learned) feed-forward neural network 400 (the learned neural network regressor). The processor 202 may be configured to encode the other image block by use of the predicted optimal QP. Hence, by use of the approach that uses the neural network regressor, a systematic and efficient mechanism may be provided to establish a relation between image content, such as texture features, and an optimal QP. Different image blocks of the sequence of image frames of the video 108 or another input video may be encoded by use of the trained neural network regressor, where compression artifacts may not be visible in the encoded image blocks. The video quality may be consistent (and may not fluctuate) across different image blocks and image frames of the input video, such as the video 108 or the other input video.

In accordance with an embodiment, once the neural network regressor is trained, the processor 202 may quickly process the video to generate an encoded video that may have consist quality across different image blocks. Such optimized video processing and encoding techniques may be very useful to encode videos used in the high-resolution video services, such as UHDTV or 4KTV, and 4K content streaming services. The disclosed system and method to process video may also find applications in video-conferencing, video-telephony, digital video broadcasting, video on internet, and digital imaging industry. The disclosed system and method to process video also find applications in video-processing devices and video codec applications, such as media encoders or media players, that requires encoding of video for reduced storage space and/or optimized data transmission rate over a communication network, such as the communication network 106 without a compromise in video quality, such as a human perceptual video quality.

Figure 5A:
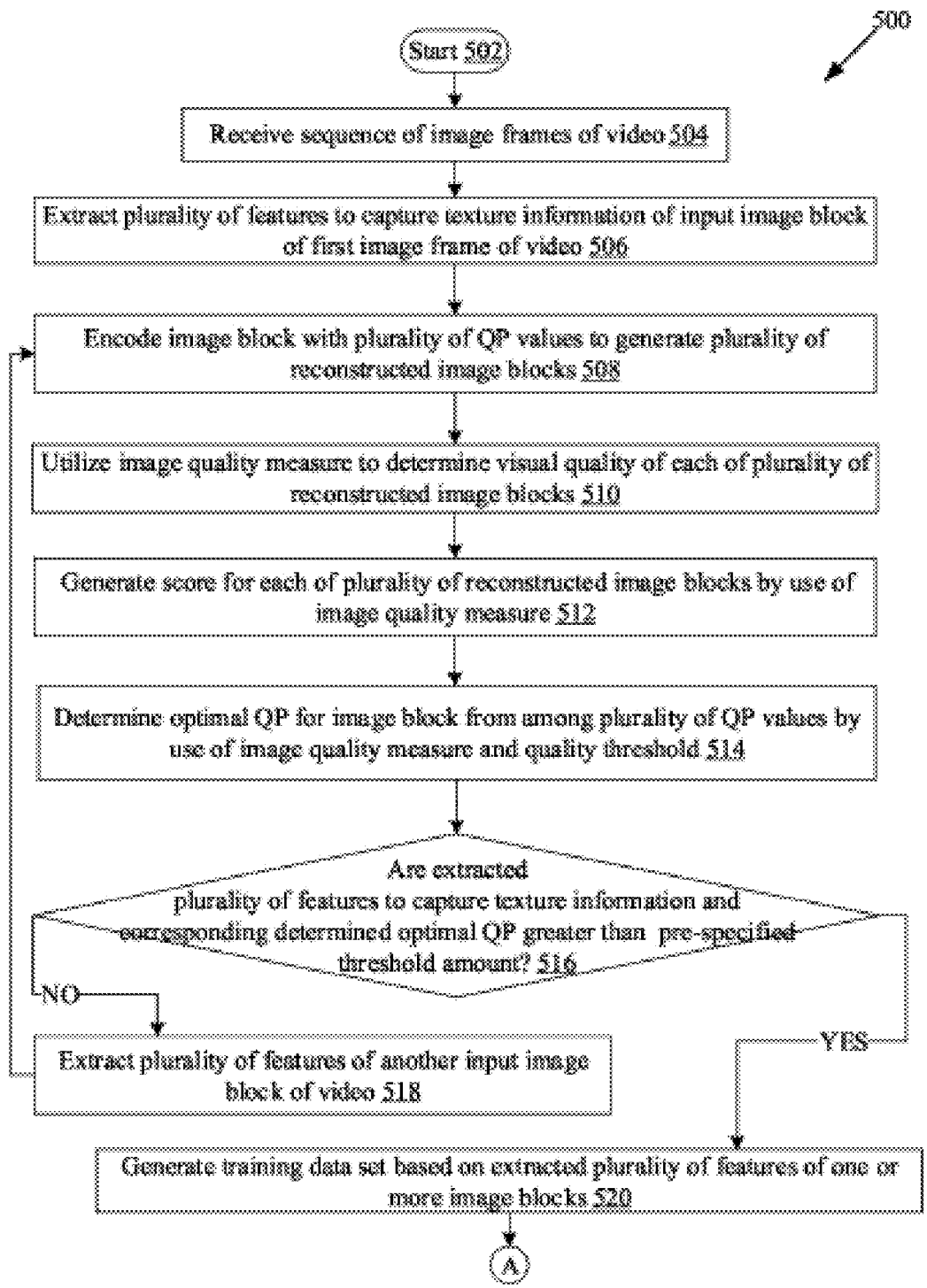
FIGS. 5A and 5B collectively depict a flow chart that illustrates an exemplary method to process video based on quantization parameters, in accordance with an embodiment of the disclosure.
Figure 5B:
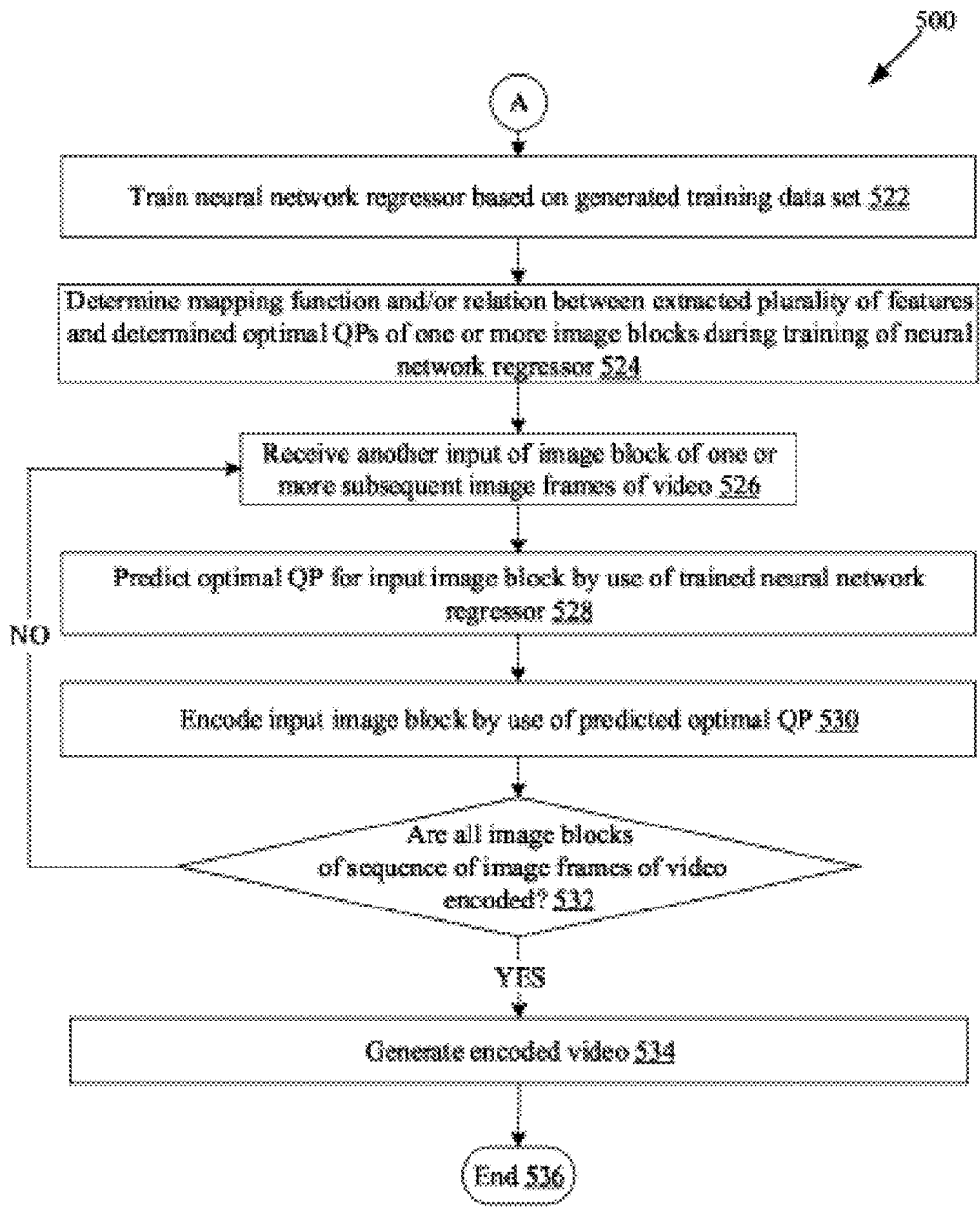

FIGS. 5A and 5B collectively depict a flow chart that illustrates an exemplary method to process video based on QPs, in accordance with an embodiment of the disclosure.

With reference to FIGS. 5A and 5B, there is shown a flow chart 500. The flow chart 500 is described in conjunction with FIGS. 1, 2, 3, and 4. The method starts at step 502 and proceeds to step 504.

At step 504, an image sequence of a video, such as the video 108, may be received. At step 506, a plurality of features to capture texture information of an input image block of a first image frame of the video (such as the video 108), may be extracted. In accordance with an embodiment, the plurality of features to capture texture information may be the Haralick texture descriptors, the total-variation, and the variance, (as described previously in FIG. 2).

At step 508, the image block (such as the image block 302) of the first image frame may be encoded with a plurality of QP values (such as the QPs "1" to "NT") to generate a plurality of reconstructed image blocks (such as the reconstructed image blocks 306a to 306n) for the image block of the first image frame. At step 510, an image quality measure, such as the FRCNN, may be utilized to determine visual quality of each of the plurality of reconstructed image blocks (such as the reconstructed image blocks 306a to 306n). The FRCNN quality measure may approximate the subjective quality and may be a reliable, computationally efficient, and cost-effective image quality measure used for the purpose of the QP prediction.

At step 512, a score for each of the plurality of reconstructed image blocks (such as the reconstructed image blocks 306a to 306n) may be generated. Such scores (such as the plurality of scores 310, depicted by "$S_1$ to $S_N$") may be generated by use of the image quality measure, such as the FRCNN. The generated score may indicate a measure of visual quality of each of the plurality of reconstructed image blocks. At step 514, an optimal QP may be determined from among the plurality of QP values by use of the image quality measure (such as the FRCNN) and a quality threshold. The optimal QP may be the highest QP value among the plurality of QP values that meet the quality threshold.

At step 516, it may be determined whether the extracted plurality of features used to capture texture information of one or more image blocks, such as the image block of the first image frame, and associated determined optimal QPs, are greater than a pre-specified threshold amount. For instance, the pre-specified threshold amount may correspond to a certain pre-specified number of image blocks and/or their associated, determined optimal QPs that may have been processed. In instances when the extracted plurality of features used to capture texture information of one or more image blocks and associated determined optimal QPs, are less than the pre-specified threshold amount, the control may pass to step 518. In instances when the extracted plurality of features used to capture textile information of one or more image blocks and associated, determined optimal QPs, are equal to or greater than the pre-specified threshold amount, the control may pass to step 520.

At step 518, the plurality of features to capture texture information of another input image block, such as another image block of the first image frame of the video 108, may be extracted. The control may return to step 508, and steps 508 to 514 may be repeated to determine the optimal QP for the input image block.

At step 520, a training data set may be generated based on the extracted plurality of features of one or more image blocks and corresponding determined optical QPs of the one or more image blocks, as described above. To generate a large training data set, the plurality of features of all the image blocks of at least the first image frame of the video and associated optimal QPs, may be used. At step 522, a neural network regressor may be trained based on the generated training data set (as described in FIG. 4).

At step 524, a mapping function and/or a relation between the extracted plurality of features and the determined optical QPs of the one or more image blocks may be determined while the neural network regressor is trained. The neural network regressor may be a feed-forward neural network based regression model, as described in FIG. 4. At step 526, another input of an image block of subsequent image frames, such as a second image frame of the video (such as the video 108), may be received.

At step 528, an optimal QP for the input image block, such as the image block of the second image frame, may be dynamically predicted by use of the trained neural network regressor. At step 530, the input image block, such as the image block of the second image frame, may be encoded by use of the predicted optimal QP.

At step 532, it may be determined whether all image blocks of the received sequence of images of the video are encoded. In instances when all the image blocks of the received sequence of images of the video are encoded, the control may pass to the step 534. In instances when all the image blocks of the received sequence of images of the video are not encoded, the control may return to step 526. Various image blocks of the second image frame and subsequent image frames of the video may be encoded by use of associated, predicted optimal QPs, based on the trained neural network regressor.

At step 534, an encoded video may be generated. Compression artifacts may not be visible in the encoded video. The video quality may be consistent (and may not fluctuate) across different image blocks and image frames of the input video, such as the video 108. Control passes to end step 536.

In accordance with an embodiment of the disclosure, a system to process video based on the QPs is disclosed. A device, such as the video-processing device 102 (FIG. 1), may comprise one or more processors (hereinafter referred to as the processor 202 (FIG. 2)). The processor 202 may be configured to extract a plurality of features to capture texture information of an image block. The processor 202 may be further configured to train a neural network repressor to map the extracted plurality of features to determine an optimal quantization parameter. The processor 202 may be further configured to encode the image block by use of the determined optimal quantization parameter.

Various embodiments of the disclosure may provide a non-transitory computer readable medium and/or storage medium, and/or a non-transitory machine readable medium and/or storage medium having stored thereon, a set of instructions executable by a machine and/or a computer to process video based on the quantization parameter. The set of instructions in the video processor, such as the video-processing device 102 (FIG. 1), may cause the machine and/or computer to perform the steps that comprise extraction of a plurality of features to capture texture information of an image block. A neural network regressor may be trained to map the extracted plurality of features to determine an optimal quantization parameter. The image block may be encoded by use of the determined optimal quantization parameter.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system for video processing, said system comprising:
   at least one circuit in a video processor, wherein said at least one circuit is configured to:
   extract a first plurality of features of each image block of a first plurality of image blocks of a first image frame;
   capture texture information of each image block of said first plurality of image blocks of said first image frame based on said extracted first plurality of features;
   encode an image block of said first plurality of image blocks with a first plurality of quantization parameters to generate a plurality of reconstructed image blocks for said image block;
   determine a first optimal quantization parameter of said first plurality of quantization parameters for said image block based on an image quality measure for each reconstructed image block of said plurality of reconstructed image blocks;
   map said extracted first plurality of features to said determined first optimal quantization parameter based on said texture information; and
   encode said image block of said first plurality of image blocks of said first image frame based on said determined first optimal quantization parameter.

2. The system according to claim 1, wherein said image quality measure is a full-reference image quality measure based on convolution neural network.

3. The system according to claim 1, wherein
   said at least one circuit is further configured to generate a score for each reconstructed image block of said plurality of reconstructed image blocks based on said image quality measure, and
   said score indicates a measure of visual quality of each reconstructed image block of said plurality of reconstructed image blocks.

4. The system according to claim 3, wherein
   a value of said determined first optimal quantization parameter is highest amongst values of said first plurality of quantization parameters, and
   said value of said determined first optimal quantization parameter is greater than or equal to a specified image quality threshold.

5. The system according to claim 1, wherein
   said at least one circuit is further configured to generate a training data set based on a second plurality of features of said image block of a second image frame, and
   said second plurality of features corresponds to a second optimal quantization parameter of said image block of said second image frame.

6. The system according to claim 5, wherein
   said generated training data set includes:
   a third plurality of features of a second plurality of image blocks of said second image frame, and
   a second plurality of optimal quantization parameters that corresponds to said second plurality of image blocks, wherein said third plurality of features includes said second plurality of features, and
   said at least one circuit is further configured to:
   extract said third plurality of features of said second plurality of image blocks; and
   capture said texture information of said second plurality of image blocks based on said extracted third plurality of features.

7. The system according to claim 5, wherein said at least one circuit is further configured to train a neural network regressor based on said generated training data set.

8. The system according to claim 1, wherein said at least one circuit is further configured to determine a mapping function between said extracted first plurality of features and said determined first optimal quantization parameter for each image block of said first plurality of image blocks of said first image frame based on a neural network regressor.

9. The system according to claim 8, wherein said neural network regressor is a feed-forward neural network based regression model.

10. The system according to claim 8, wherein
    said at least one circuit is further configured to determine a second optimal quantization parameter for said image block of a second image frame based on said neural network regressor, and
    said second image frame and said first image frame correspond to video content.

11. The system according to claim 1, wherein said at least one circuit is further configured to train a neural network regressor to map said extracted first plurality of features to determine a second optimal quantization parameter for said image block of a second image frame.

12. A method for video processing, said method comprising:
    extracting, by at least one circuit in a video processor, a first plurality of features of each image block of a first plurality of image blocks of a first image frame;
    capturing, by said at least one circuit, texture information of each image block of said first plurality of image blocks of said first image frame based on said extracted first plurality of features;
    encoding, by said at least one circuit, an image block of said first plurality of image blocks with a first plurality of quantization parameters to generate a plurality of reconstructed image blocks for said image block;

determining, by said at least one circuit, a first optimal quantization parameter of said first plurality of quantization parameters for said image block, based on an image quality measure for each reconstructed image block of said plurality of reconstructed image blocks;

mapping said extracted first plurality of features to said determined first optimal quantization parameter based on said texture information; and encoding, by said at least one circuit, said image block of said first plurality of image blocks of said first image frame based on said determined first optimal quantization parameter.

13. The method according to claim 12, wherein said image quality measure is a full-reference image quality measure based on convolution neural network.

14. The method according to claim 13, further comprising generating, by said at least one circuit, a score for each reconstructed image block of said plurality of reconstructed image blocks based on said image quality measure, wherein said score indicates a measure of visual quality of each reconstructed image block of said plurality of reconstructed image blocks.

15. The method according to claim 13, further comprising:

generating, by said at least one circuit, a training data set based on a second plurality of features of said image block of a second image frame, wherein said second plurality of features corresponds to a second optimal quantization parameter of said image block of said second image frame; and training, by said at least one circuit, a neural network regressor based on said generated training data set.

16. The method according to claim 12, further comprising determining, by said at least one circuit, a mapping function between said extracted first plurality of features and said determined first optimal quantization parameter for each image block of said first plurality of image blocks of said first image frame based on a neural network regressor.

17. The method according to claim 16, wherein said neural network regressor is a feed-forward neural network based regression model.

18. The method according to claim 16, further comprising determining, by said at least one circuit, a second optimal quantization parameter for said image block of a second image frame based on said neural network regressor, wherein said second image frame and said first image frame correspond to video content.

19. The method according to claim 12, further comprising training a neural network regressor to map said extracted first plurality of features to determine a second optimal quantization parameter for said image block of a second image frame.

20. A system for video processing, said system comprising:

at least one circuit in a video processor, wherein said at least one circuit is configured to:

extract a plurality of features of an image block;

capture texture information of said image block based on said extracted plurality of features;

map said extracted plurality of features to one of a plurality of optimal quantization parameters by a neural network regressor based on said texture information;

determine an optimal quantization parameter of said plurality of optimal quantization parameters for said image block based on said mapping;

encode said image block based on said determined optimal quantization parameter;

encode said image block of an image frame with a plurality of quantization parameters;

generate a plurality of reconstructed image blocks for said image block of said image frame based on said encoded image block; and determine said optimal quantization parameter based on an image quality measure for each reconstructed image block of said plurality of reconstructed image blocks, wherein said image quality measure is a full-reference image quality measure based on convolution neural network.

\* \* \* \* \*